Patented Nov. 8, 1927.

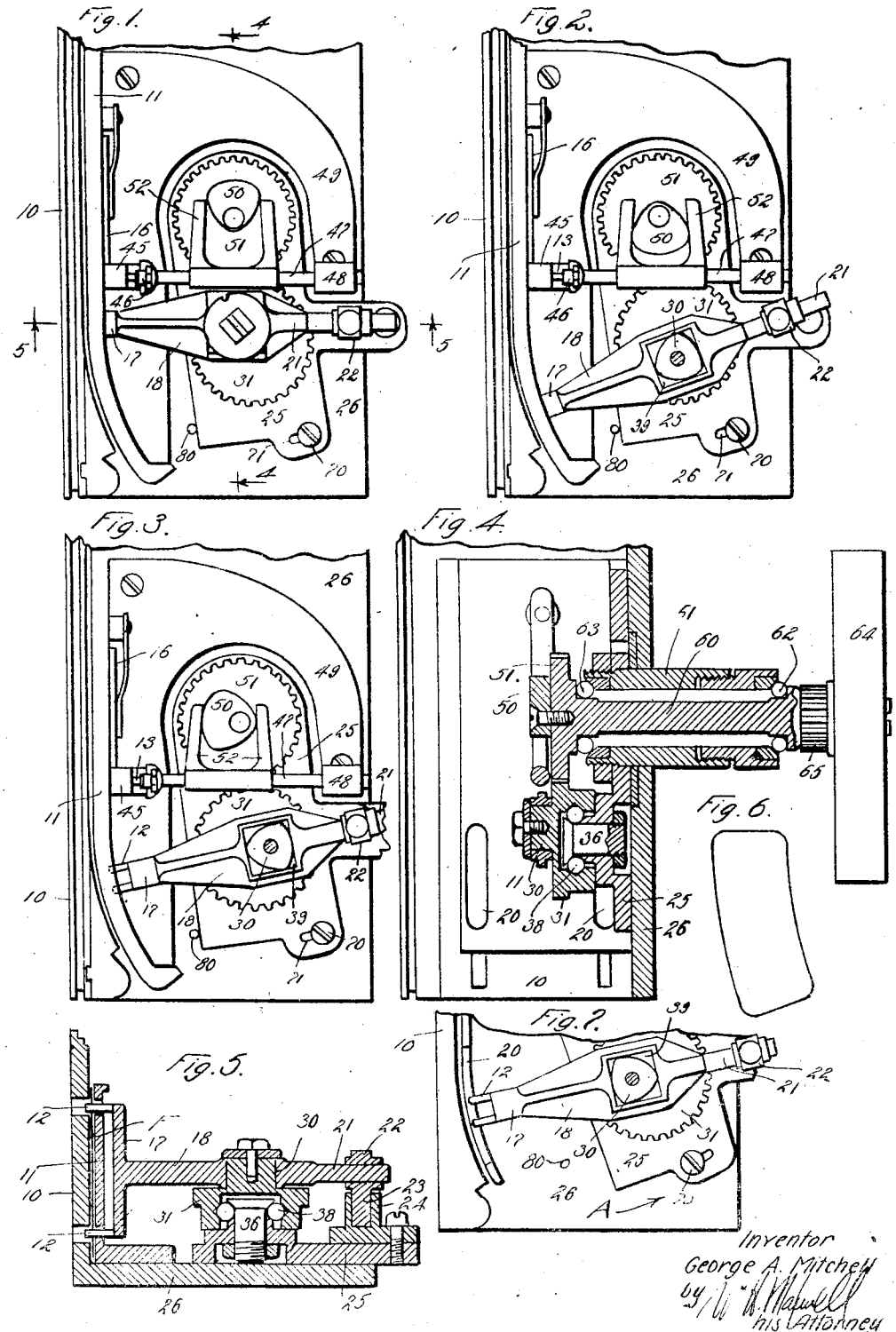

1,648,559

UNITED STATES PATENT OFFICE.

GEORGE A. MITCHELL, OF LOS ANGELES, CALIFORNIA, ASSIGNOR TO MITCHELL CAMERA CORPORATION, OF LOS ANGELES, CALIFORNIA, A CORPORATION OF CALIFORNIA.

MOVEMENT MECHANISM FOR CAMERAS AND THE LIKE.

Application filed December 7, 1925. Serial No. 73,674.

This invention has to do with a film handling mechanism and relates particularly to a movement mechanism for cameras, or the like.

An object of my present invention is to provide a film moving mechanism which is effective and reliable in operation and which can be operated at high speeds.

It is another object of this invention to provide a movement mechanism in which the film engaging parts enter and leave the perforations of the film in directions perpendicular to the plane of the film.

A further object of this invention is to provide a film moving mechanism which involves only a few simple reliable operating parts.

The objects and features of my invention will be more fully understood from the following detailed description of a typical form of the invention througout which description reference is had to the accompanying drawings, in which:

Fig. 1 is a side elevation of the mechanism showing the parts in position where the film moving pins are entering the film; Fig. 2 is a view similar to Fig. 1 showing the parts in position where the film moving pins are leaving the film, certain parts being broken away to show in section; Fig. 3 is a view similar to Figs. 1 and 2 showing the parts in position where the film moving pins are in about the middle of their return movement, certain parts being broken away to show in section as in Fig. 2; Fig. 4 is a detailed sectional view taken as indicated by 4—4 on Fig. 1; Fig. 5 is a detailed sectional view taken as indicated by line 5—5 on Fig. 1; Fig. 6 is a diagrammatic view illustrating the path of movement of the film moving pins; Fig. 7 is a view showing a portion of the mechanism in position to allow the film to be placed in or removed from it.

In the particular form of the invention illustrated in the drawings the film F is carried between an aperture plate 10 and guide plate 11. Film moving pins 12 are operated to engage the film and intermttently advance or move it between the plates and pilot pins 13 operating to engage and positively hold the film when it is not being moved by the pins 12.

The aperture plate 10 is a substantially flat plate vertically disposed and provided with an exposure aperture. The film F is moved vertically (downwardly) at the rear of the aperture plate. The rear face of the aperture plate is flat or vertical except at the lower end portion where it is curved somewhat rearwardly. The guide plate 11 is spaced immediately behind the aperture plate and conforms to the rear side of the aperture plate, being rearwardly curved at its lower end to correspond to the curvature of the aperture plate. A suitable pressure plate 16 is carried by the guide plate 11 in register with the aperture to hold the film F tight at the aperture.

In accordance with my invention the film moving pins 12 are carried at opposite ends of a crosshead 17 provided on the forward end of an arm 18. The arm 18 and crosshead 17 are located at the rear of the guide plate 11. The guide plate is provided with longitudinal slots 20 in line with the edge portions of the film F so that the pins 12 can be moved into proper engagement with the perforations in the film. In the drawings I have shown a pair of pins 12 on each end of the crosshead so that four pins 12 engage the film to move it. The rear end 21 of arm 18 is slidably carried in a bearing 22 allowing the arm to be moved longitudinally to carry the pins 12 into and out of co-operative engagement with the film F. The bearing 22 is pivotally mounted so that the arm can be oscillated to carry the pins in a direction longitudinal of the film. The bearing 22 may be provided with a trunnion 23 carried in a bearing 24. The bearing 24 is on a carrier 25 pivotally mounted on a flange like frame part 26 extending rearwardly from one vertical edge of the aperture plate.

The arm 18 is operated by a cam 30 carried on the outer side of a rotating member 31. The rotating member 31 is in the form of a gear and is rotatably mounted on the carrier 25. The mounting shown in the drawings includes a trunnion or projection 36 extending from the carrier. The gear 31 is rotatably mounted on the projection 36 through ball bearings 38. The cam 30 operates in a square opening 39 in the arm so that rotation of the gear causes the arm to oscillate about the axis of the trunnion and to move longitudinally in the bearing. The cam and opening are designed and proportioned so that the pins 12 carried by the crosshead 17 move in a path such as is illustrated in Fig. 6 of the drawings.

It is to be noted that the pins are moved straight at the ends of their movement so that they enter and leave the film in directions perpendicular to the plane thereof and that in moving from the up position to the down position the pins move in a curved path, the same as that of the film at the curved portion of the aperture plate. With the construction above described the pins 12 move straight into engagement with the film in a direction perpendicular to the plane of the film, move down in a curved direction corresponding to the curved part of the aperture plate, move out of engagement with the film in a direction perpendicular to the plane of the film and then return to the starting position or upper end of their movement clear of the film.

The corners of the movement or path are not angular but are slightly curved as clearly shown in the diagram. The straight movement of the pins at the upper and lower ends of their movement causes the film to be stationary when the pins engage and leave it.

The pilot pins 13 are carried in bearings 45 on the guide plate 11 so that they are movable into and out of engagement with the film in proper synchronism with the pins 12 to positively hold the film against movement when it is not being moved by the pins 12. The pins 13 are carried on the ends of a crosshead 46 on the forward end of an arm 47. The rear end of the arm is slidably carried in a bearing 48 provided on a rearward extension 49 of guide plate 11. In accordance with my invention the pilot pins 13 are carried by the bearings 45 so that they can be operated by movement of the arm 47 into and out of engagement with perforations in the edge portion of the film F.

In accordance with my invention the arm is operated by a cam 50 so that it moves the pilot pins into and out of engagement with the film in proper synchronism with the movement pins. The cam 50 is carried on a rotary member or gear 51 and engages or is operatively connected with the arm through two spaced parts 52 projecting from the arm. The cam 50 fits or operates between the parts 52 in the manner clearly illustrated in Figs. 1, 2 and 3 of the drawings. The cam 50 and parts 52 are designed and related so that they operate to move the arm 47 in the desired manner. The gears 31 and 51 of the mechanisms which operate the pilot pins and movement pins mesh together so that the pins are maintained in proper synchronism.

In the particular construction shown in the drawings the mechanism is adapted to be operated or driven through a shaft 60 which carries the gear 51. The shaft 60 is mounted in a tubular housing 61 through ball bearings 62 and 63 at the ends of the housing. The housing 61 is carried by the frame 26. The outer end of the shaft 60 carries a fly wheel 64 and a gear 65 through which the shaft may be operated.

In accordance with this invention the carrier 25 supporting the gear 31 and bearing 24 is mounted so that it can be moved or shifted to facilitate the placement of film in or removal of film from the mechanism. In the preferred construction the carrier is pivotally mounted to swing about the axis of the shaft 60 and gear 51. In the construction shown in the drawings the carrier is rotatably carried on a suitable part of the housing 61 and is adapted to be set against pivotal movement, by a clamp screw 70 extending through a slot 71 in the outer part of the carrier 25 and screw threading into frame 26. By thus pivotally mounting the carrier it can be swung or shifted without disconnecting the gears 31 and 51 and therefore without disturbing the co-operative relations between pilot pins and movement pins. At the time of manufacturing the device the carrier 25 is moved to a position in which the movement pins 12 operate to move the film the desired amount. A stop pin 80 is then arranged in the frame 26 to prevent movement of the carrier further toward the aperture plate. To put the mechanism in position where the film can be arranged in or removed from the aperture plate and guide plate the mechanism is moved to a position where the movement pins 12 are in engagement with the film and the pilot pins out of engagement with the film. The clamp screw 70 is then released and the carrier swung away from the aperture plate as indicated by the arrow A in Fig. 7 until the movement pins are out of engagement with the film. With the parts in this position the film can be easily passed between or moved from between the aperture plate and guide plate. When a film has been properly arranged between the plates the mechanism can be returned to operating position by swinging the carrier 25 back to its original position in engagement with the stop pin 80 whereupon it can be set by tightening clamp screw 70.

Having described only a typical preferred form of my invention I do not wish to limit myself to the specific details set forth, but wish to reserve to myself any changes or variations that may appear to those skilled in the art or fall within the scope of the following claims.

Having described my invention, I claim:

1. A movement mechanism including, an aperture plate, a carrier movable to and away from the plate, an arm slidably pivotally carried by the carrier, a pin carried by the arm to engage a film at the plate, and cam means for operating the arm, the movement of the carrier being in a direction and of an extent sufficient to move the pin into and out of operating position with reference to the plate.

2. A movement mechanism including, an aperture plate, a carrier movable to and away from the plate, an arm slidably pivotally carried by the carrier, a pin carried by the arm to engage a film at the plate, and a cam carried by the carrier to operate the arm, the movement of the carrier being in a direction and of an extent sufficient to move the pin into and out of operating position with reference to the plate.

3. A movement mechanism including, an aperture plate, a carrier mounted for pivotal movement with reference to the plate, an arm carried by the carrier, a pin carried by the arm to engage a film at the plate, a cam carried by the carrier to operate the arm, and means for operating the cam including a drive gear concentric with the pivotal mounting of the carrier.

4. A movement mechanism including, an aperture plate, a carrier mounted for pivotal movement with reference to the plate, an arm carried by the carrier, a pin carried by the arm to engage a film at the plate, a cam carried by the carrier to operate the arm, and means for operating the cam including, two meshing gears one coaxial with the cam and the other coaxial with the mounting of the carrier.

5. A movement mechanism including, a mechanism operable to intermittently move a film, a mounting for the mechanism whereby it is shiftable as a unit into and out of operating position with reference to the film, a mechanism operable to hold the film against movement, and a connection between the mechanisms whereby they are maintained connected to operate in synchronism.

6. A movement mechanism including, a mechanism operable to intermittently move a film, and shiftable bodily to and away from the film into and out of operating position with reference to the film, a mechanism operable to hold the film against movement, and a constantly meshing gear connection between the mechanisms whereby they are maintained connected to operate in synchronism.

7. A movement mechanism including, a cam actuated mechanism operable to intermittently move a film, and shiftable bodily to and away from the film into and out of operating position with reference to the film, a cam actuated mechanism operable to hold the film against movement, and a constantly meshing gear connection between the mechanisms whereby they are maintained connected to operate in synchronism.

8. A movement mechanism including, an aperture plate, a carrier pivotally mounted with reference to the plate, an arm mounted to reciprocate relative to the plate, a pin carried by the arm to engage a film at the plate to hold it against movement, an arm carried by the plate to oscillate and reciprocate, a pin carried by the last mentioned arm to engage and move the film when the plate is in one position, and means for operating the arms.

9. A movement mechanism including, two meshed gears, two independently mounted pin carrying arms, one operable so that its pins positively engage a film to hold it against movement, the other operable so that its pins positively engage the film to move it, a cam on one gear directly operating one of the arms, and a cam on the other gear directly operating the other arm.

10. A movement mechanism including, an operating shaft having a fixed axis of rotation, a carrier mounted to rotate on the axis of the shaft, a gear mounted on the shaft, a second gear mounted on the carrier in mesh with the first mentioned gear, two pin carrying arms one operable to hold a film against movement, the other operable to move the film, a cam on one gear to actuate one arm, and a cam on the other gear to actuate the other arm.

11. A movement mechanism including two film engaging devices one operable to hold the film against movement, and the other operable to move the film, an interconnection between the devices whereby the film is normally continually engaged by the devices, and means whereby one of the devices is shiftable as a unit to a position out of engagement with the film at a time when the other device is out of engagement with the film.

In witness that I claim the foregoing I have hereunto subscribed my name this 18th day of November, 1925.

GEORGE A. MITCHELL.